(12) United States Patent
Sahin

(10) Patent No.: US 11,782,768 B2
(45) Date of Patent: Oct. 10, 2023

(54) METHODS OF OFFLOADING COMPUTATION FROM MOBILE DEVICE TO CLOUD

(71) Applicant: IDAC HOLDINGS, INC., Wilmington, DE (US)

(72) Inventor: Onur Sahin, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 747 days.

(21) Appl. No.: 16/065,577

(22) PCT Filed: Dec. 22, 2016

(86) PCT No.: PCT/US2016/068301
§ 371 (c)(1),
(2) Date: Jun. 22, 2018

(87) PCT Pub. No.: WO2017/112866
PCT Pub. Date: Jun. 29, 2017

(65) Prior Publication Data
US 2021/0182118 A1    Jun. 17, 2021

Related U.S. Application Data

(60) Provisional application No. 62/387,556, filed on Dec. 23, 2015.

(51) Int. Cl.
*G06F 9/50* (2006.01)
*H04W 52/02* (2009.01)

(52) U.S. Cl.
CPC .......... *G06F 9/5083* (2013.01); *G06F 9/5027* (2013.01); *G06F 9/5094* (2013.01); *H04W 52/0225* (2013.01); *Y02D 10/00* (2018.01)

(58) Field of Classification Search
CPC .... G06F 9/5083; G06F 9/5027; G06F 9/5094; H04W 52/0225
See application file for complete search history.

(56) References Cited

U.S. PATENT DOCUMENTS 6,404,756 B1 * 6/2002 Whitehill ............... H04L 43/00
370/445
9,100,967 B2 * 8/2015 Quan ................ H04W 72/0493
(Continued)

OTHER PUBLICATIONS

Yang, et al. "Techniques to Minimize State Transfer Costs for Dynamic Execution Offloading in Mobile Cloud Computing". IEEE Transactions on Mobile Computing. vol. 13, No. 11. (Year: 2014).*
(Continued)

*Primary Examiner* — Adam Lee
(74) *Attorney, Agent, or Firm* — Condo Roccia Koptiw LLP

(57) ABSTRACT

Systems, methods and instrumentalities are disclosed for offloading computation for an application on a local device in a wireless network, comprising determining service-level requirements for the application, wherein the service-level requirements comprise one or more of latency, reliability, and power consumption for processing; determining wireless network conditions; determining local device conditions; partitioning the application into one or more tasks; comparing a processing time of a task at the local device to a latency requirement of the task, and: if the processing time of the local device would exceed the latency requirement of the task, determining to offload the task; and if the processing time of the local de vice would not exceed the latency requirement of the task, comparing a power consumed at the local device to offload the task to a power consumed at the local device to execute the task, wherein if the power consumed at the local device to offload the task is less than the power consumed (e.g., while satisfying the latency and (Continued)

reliability requirements of the task) at the local device to execute the task, determining to offload the task.

14 Claims, 11 Drawing Sheets

(56) References Cited

U.S. PATENT DOCUMENTS

| | | | | |
|---|---|---|---|---|
| 9,104,412 | B2* | 8/2015 | Lynar | G06F 11/3058 |
| 9,229,526 | B1* | 1/2016 | Neglur | G06F 15/76 |
| 2001/0011023 | A1* | 8/2001 | Nishioka | H04W 52/50 455/67.11 |
| 2001/0027486 | A1* | 10/2001 | Takamoto | H04L 1/1809 709/227 |
| 2005/0002368 | A1* | 1/2005 | Kwon | H04L 1/0009 370/342 |
| 2005/0152320 | A1* | 7/2005 | Marinier | H04W 16/06 370/349 |
| 2006/0282739 | A1* | 12/2006 | Meyer | H04L 1/1678 714/748 |
| 2007/0118549 | A1* | 5/2007 | Bornhoevd | G06F 9/5027 |
| 2007/0183432 | A1* | 8/2007 | Kim | H04L 1/0001 370/400 |
| 2008/0117872 | A1* | 5/2008 | Kim | H04L 27/2602 370/329 |
| 2009/0046641 | A1* | 2/2009 | Wang | H04W 74/0866 370/329 |
| 2009/0307558 | A1* | 12/2009 | Lee | H04L 1/0625 714/749 |
| 2010/0202427 | A1* | 8/2010 | Xia | H04W 36/12 370/338 |
| 2010/0240373 | A1* | 9/2010 | Ji | H04W 36/08 455/436 |
| 2010/0254275 | A1* | 10/2010 | Kang | H04L 1/0007 370/252 |
| 2010/0262886 | A1* | 10/2010 | Ren | H04L 1/1819 714/751 |
| 2010/0313204 | A1* | 12/2010 | Haugh | G06F 1/206 718/105 |
| 2011/0119364 | A1 | 5/2011 | Zarkesh | |
| 2011/0231469 | A1* | 9/2011 | Wolman | G06F 9/5094 709/201 |
| 2011/0307110 | A1* | 12/2011 | Sharma | G06F 1/26 700/291 |
| 2011/0320520 | A1 | 12/2011 | Jain | |
| 2012/0149362 | A1* | 6/2012 | Tooher | H04W 24/10 455/423 |
| 2012/0207040 | A1* | 8/2012 | Comsa | H04W 72/1215 370/252 |
| 2012/0239734 | A1* | 9/2012 | Dominick | H04L 67/42 709/203 |
| 2013/0044797 | A1* | 2/2013 | Nammi | H04L 1/1835 375/224 |
| 2013/0097276 | A1* | 4/2013 | Sridhar | H04L 67/12 709/217 |
| 2013/0176864 | A1* | 7/2013 | Quan | H04L 1/0002 370/252 |
| 2013/0182625 | A1* | 7/2013 | Kuehnel | H04W 76/10 370/311 |
| 2013/0204917 | A1 | 8/2013 | Wang et al. | |
| 2013/0212212 | A1* | 8/2013 | Addepalli | G06F 9/4856 709/217 |
| 2013/0325823 | A1 | 12/2013 | Resch et al. | |
| 2014/0045485 | A1* | 2/2014 | Jain | H04W 52/0245 455/420 |
| 2014/0079022 | A1* | 3/2014 | Wang | H04W 36/0069 370/331 |
| 2014/0105083 | A1* | 4/2014 | Krishnaswamy | H04W 40/10 370/311 |
| 2014/0105273 | A1* | 4/2014 | Chen | H04W 52/0254 375/240.02 |
| 2014/0122558 | A1* | 5/2014 | Azar | G06F 9/5094 709/201 |
| 2014/0143787 | A1 | 5/2014 | Bostic et al. | |
| 2014/0237477 | A1 | 8/2014 | Cadambi et al. | |
| 2014/0313956 | A1* | 10/2014 | Ansari | H04W 52/0206 370/311 |
| 2014/0315536 | A1* | 10/2014 | Chow | H04W 4/50 455/419 |
| 2015/0124601 | A1* | 5/2015 | Li | H04W 28/08 370/230 |
| 2015/0139056 | A1* | 5/2015 | Wang | H04W 52/0235 370/329 |
| 2015/0281407 | A1* | 10/2015 | Raju | H04L 69/163 718/1 |
| 2016/0044035 | A1 | 2/2016 | Huang | |
| 2016/0162004 | A1* | 6/2016 | Ljubuncic | G06F 9/5083 713/320 |
| 2016/0274938 | A1* | 9/2016 | Calvanese Strinati | G06F 9/4881 |
| 2016/0344844 | A1* | 11/2016 | Lin | H04L 67/10 |
| 2018/0184459 | A1* | 6/2018 | Kim | H04L 5/00 |

OTHER PUBLICATIONS

Gember et al. "ECOS: Leveraging Software-Defined Networks to Support Mobile Application Offloading". ACM ANCS. (Year: 2012).*

Zhang et al. "To offload or not to offload: an efficient code partition algorithm for mobile cloud computing". IEEE 1st International Conference on Cloud Computing (CLOUDNET). (Year: 2012).*

Barbera et al. "Mobile Offloading in the Wild: Findings and Lessons Learned Through a Real-life Experiment with a New Cloud-aware System". IEEE INFOCOM Conference on Computer Communications. (Year: 2014).*

Ragona et al. "Energy-Efficient Computation Offloading for Wearable Devices and Smartphones in Mobile Cloud Computing". IEEE. (Year: 2015).*

Chen et al. "COCA: Computation Offload to Clouds using AOP". 12th IEEE/ACM International Symposium on Cluster, Cloud and Grid Computing. (Year: 2012).*

Yin et al. "A Mobile Cloud Computing Middleware for Low Latency Offloading of Big Data". ACM. (Year: 2015).*

Wang et al. "Accelerating the Mobile Web with Selective Offloading". ACM. (Year: 2013).*

Flores et al. "Adaptive Code Offloading for Mobile Cloud Applications: Exploiting Fuzzy Sets and Evidence-based Learning". ACM. (Year: 2013).*

Nabi et al. "Assessing the Benefits of Computational Offloading in Mobile-Cloud Applications". MobileDeLi'15. ACM. (Year: 2015).*

Kwon et al. "Facilitating the Implementation of Adaptive Cloud Offloading to Improve the Energy Efficiency of Mobile Applications". 2nd ACM International Conference on Mobile Software Engineering and Systems. (Year: 2015).*

Xia et al. "Online Algorithms for Location-Aware Task Offloading in Two-Tiered Mobile Cloud". IEEE/ACM 7th International Conference on Utility and Cloud Computing. (Year: 2014).*

Enzai et al. "A Taxonomy of Computation Offloading in Mobile Cloud Computing". 2nd IEEE International Conference on Mobile Cloud Computing, Services, and Engineering. (Year: 2014).*

Barbarossa et al. "Computation offloading for mobile cloud computing based on wide cross-layer optimization". Future Network and MobileSummit Conference Proceedings. (Year: 2013).*

Munoz et al. "Optimization of Radio and Computational Resources for Energy Efficiency in Latency-Constrained Application Offloading". IEEE Transactions on Vehicular Technology, vol. 64, No. 10. (Year: 2015).*

Kosta et al. "ThinkAir: Dynamic resource allocation and parallel execution in the cloud for mobile code offloading". Proceedings IEEE INFOCOM. (Year: 2012).*

Eom et al. "Machine Learning-based Runtime Scheduler for Mobile Offloading Framework". IEEE/ACM 6th International Conference on Utility and Cloud Computing. (Year: 2013).*

(56) References Cited

OTHER PUBLICATIONS

Altamimi et al. "Energy Cost Models of Smartphones for Task Offloading to the Cloud". IEEE Transactions on Emerging Topics in Computing. (Year: 2015).*
Chun et al., "CloneCloud: Elastic Execution between Mobile Device and Cloud", In Proceedings of the Sixth Conference on Computer Systems, ACM, Apr. 10-13, 2011, 14 pages.
Cuervo et al., "MAUI: Making Smartphones Last Longer with Code Offload", In Proceedings of the 8th International Conference on Mobile Systems, Applications, and Services, ACM, Jun. 15-18, 2010, 13 pages.
Dinh et al., "A Survey of Mobile Cloud Computing: Architecture, Applications, and Approaches", Wireless Communications and Mobile Computing, vol. 13, No. 18, Wiley Online Library, 2013, pp. 1587-1611.
Gurum et al., "Addressing the Energy Crisis in Mobile Computing with Developing Power Aware Software", UCSB Computer Science Department, 2003, 24 pages.
Kosta et al., "ThinkAir: Dynamic Resource Allocation and Parallel Execution in the Cloud for Mobile Code Offloading", Proceedings IEEE INFOCOM, Mar. 25-30, 2012, 9 pages.
O'Sullivan et al., "Integrating Mobile and Cloud Resources Management Using the Cloud Personal Assistant", CORA-Cork Open Research Archive, Jan. 2015, 34 pages.
Shiraz et al., "A Lightweight Distributed Framework for Computational Offloading in Mobile Cloud Computing", PLoS One, vol. 9, No. 8, Aug. 15, 2014, 19 pages.
Wang et al., "Analysis of Local Re-execution in Mobile Offloading System", IEEE, 2013, pp. 31-40.

* cited by examiner

METHODS OF OFFLOADING COMPUTATION FROM MOBILE DEVICE TO CLOUD

CROSS REFERENCE TO RELATED APPLICATION

This application is a National Stage entry under U.S.C. § 371 of Patent Cooperation Treaty Application PCT/US2016/068301, filed Dec. 22, 2016, which claims the benefit of Provisional U.S. Patent Application No. 62/387,556, filed on Dec. 23, 2015, the contents of which are hereby incorporated by reference herein.

BACKGROUND

Recent development and popularity of smart phones and/or mobile applications (e.g., virtual and augmented reality, speech recognition, and/or high definition video services) may enable mobile devices to use the resources of cloud computing (e.g., computing, storage, operating systems, software, etc.) via wired and/or wireless networks. Mobile cloud computing (MCC) aims at including mobile devices in a cloud computing-like scenario, for example, such that the computation and/or power limitations of mobile applications and services may be overcome. The challenges in MCC may be different from those in traditional cloud computing technology. Frameworks and methods may be desirable to realize the potential of MCC.

SUMMARY

Systems, methods and instrumentalities are disclosed for offloading computation for an application on a local device in a wireless network. The local device (e.g., a WTRU) may determine service-level requirements for the application, where the service-level requirements comprise one or more of latency, reliability, and power consumption for processing. The local device may then determine wireless network conditions and local device conditions. The local device may determine to partition the application into one or more tasks, and compare a processing time of a task at the local device to a latency requirement of the task. The latency requirement may include an amount of time incurred to upload the task to a remote entity, an amount of time incurred to process the task at the remote entity, and/or an amount of time incurred to download the executed task once processed by the remote entity. The local device may obtain the latency requirement from the application (e.g., service-level). If the local device determines that the processing time of the local device would exceed the latency requirement of the task, then the local device may determine to offload the task. For example, the latency incurred once the local entity opts for offloading may include the total amount of time for the task upload, processing at the remote entity, and the time it takes to download the result processed at the remote entity. If the local device determines that the processing time of the local device would not exceed the latency requirement of the task, then the local device may compare a power consumed at the local device to offload the task to a power consumed at the local device to execute the task, where if the power consumed at the local device to offload the task is less than the power consumed (e.g., while satisfying the latency and reliability requirements of the task) at the local device to execute the task, then the local device may determine to offload the task. And if the local device determines that the power consumed at the local device to offload the task is greater than the power consumed (e.g., while satisfying the latency and reliability requirements of the task) at the local device to execute the task, then the local device may determine to execute the task locally.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
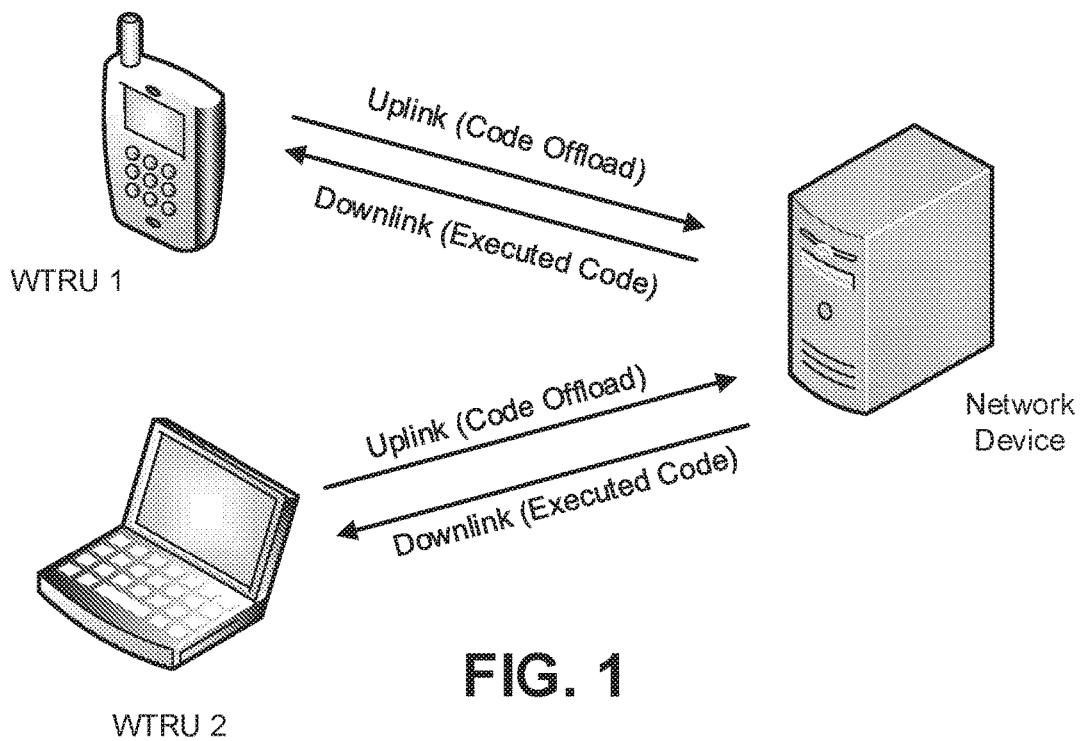
FIG. 1 depicts an example mobile cloud computing (MCC) architecture.

FIG. 1 shows an example mobile cloud computing (MCC) architecture. MCC may utilize cloud computing technologies. MCC may collaboratively utilize the underlying computation power of contributing system elements in a wireless network. The wireless network may include one or more wireless transmit/receive units (WTRUs). Examples of WTRUs depicted in FIG. 1 include a smartphone (WTRU 1) and a laptop computer (WTRU 2). The wireless network may include a network device. Examples of network devices are servers and other networking resources.

MCC may face challenges such as mobility and unreliability in the wireless links. The design of MCC may consider mobile device integration, quality of service, service level requirements of the mobile applications (e.g., latency, reliability, and/or power consumption), etc. Cloud computing techniques (e.g., power techniques such as application partitioning and code offloading) may be built upon distributed computing. For example, application partitioning may divide an application (e.g., software blocks of such an application) into one or more blocks (e.g., serializable blocks). The blocks may be denoted as tasks. The tasks may be serialized. Code offloading may transmit the blocks (or tasks) from the local device(s) and/or WTRU 2) to the remote network entity/device over the wireless medium.

MCC design may include one or more of the cloud computing techniques (e.g., the application partitioning and/or code offloading techniques described herein). The design may take the underlying system and/or wireless resources (e.g., CPU power, link capacity, and/or reliability) into account.

MCC solutions may take a systematic approach. Mobile computing offloading (MCO) may be an enabler of MCC. MCO may allow distributed and/or parallel computation of applications. A code offloading framework may be developed between a local device a mobile device) and network elements. An example framework may include one or more modules (e.g., combination of modules) configured to handle device virtualization, client-server communication, mobile agents, and/or other tasks. For example, device virtualization may enable parallel and/or independent execution of the offloaded tasks. The virtual machines may be used for task storage and/or task execution, for example. An example implementation may configure a guest operating system in a remote entity to process offloaded tasks. Client-server communication may be responsible for code offloading between a local device and remote entities. Mobile agents may be developed to execute and collate the tasks distributed in the offloading framework.

Figure 2:
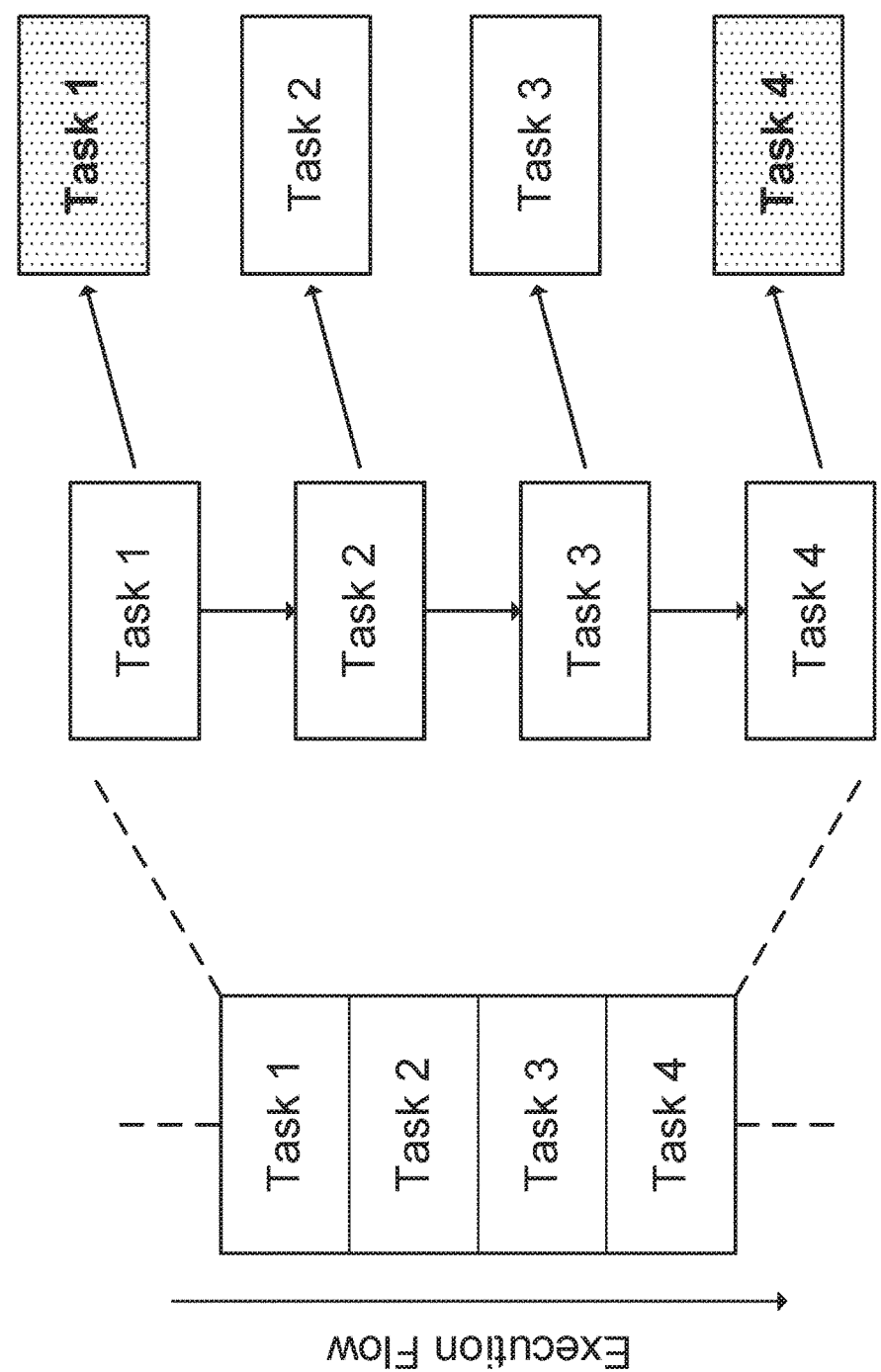
FIG. 2 depicts an example of local and remote task partitioning.

FIG. 2 shows an example of local and remote task partitioning. Execution flow of an application may be partitioned into multiple tasks. One or more of these tasks (e.g., Task 2 and Task 3) may be executed locally (e.g., at the device). One or more of these tasks (e.g., Task 1 and Task 4) may be executed remotely from the perspective of the local device, for example, by one or more remote entities.

Figure 3:
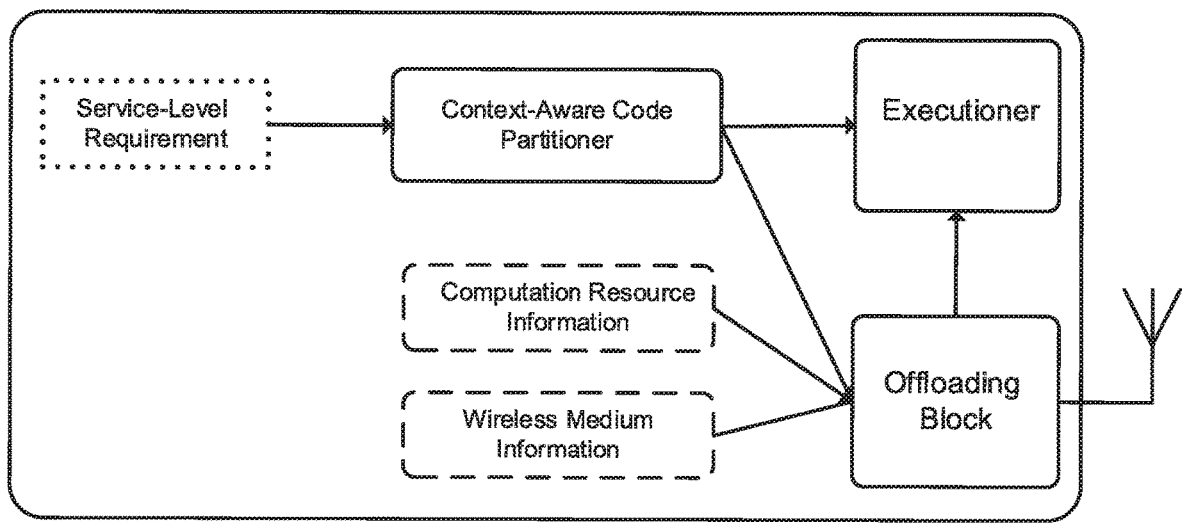
FIG. 3 depicts an example task offloading architecture at a local device.

FIG. 3 shows an example task offloading architecture at a local device. The example architecture may include one or more functions (which may be referred to herein as blocks) such as a Code Partitioner, an Executioner, and Offloading Block. The device may have one or more applications (not depicted). An application may require computational resources. For example, an application may be a mobile application residing on a WTRU (e.g., cell-phone, tablet, etc.), a desktop application residing on a personal computer, a cloud application, and/or the like.

The Code Partitioner may be context aware. The Code Partitioner may receive service level requirements for an application. Examples of service level requirements include latency, reliability, and/or power consumption. The Code Partitioner may partition an application into one or more tasks. The Code Partitioner may forward tasks to the Executioner and/or the Offloading Block. For example, the Executioner block may be activated for local processing. The Code Partitioner may forward tasks to the Offloading Block. For example, the Offloading Block may be involved in remote execution of the task. The Offloading Block may identify the system configuration and/or wireless transmission parameters (e.g., using the algorithms for identifying the parameters as described herein). The Offloading Block may send the task to a remote entity. The Offloading Block may receive an executed task from the remote entity. The Offloading Block may forward the executed task to the Executioner. The execute task and the application execution flow may be combined (e.g., by the Executioner).

One or more of the following considerations may be taken into account in the design of the offloading framework. Framework modules (e.g., partitioning, cloning/virtualization, task offloading, etc.) may collectively utilize computation and wireless resources (e.g., CPU, total power such as battery power, transmission scheduling, transmission duration, modulation-coding schemes, etc.). The utilization of the system resources may aim to increase the efficiency of the utilization and/or to reduce conflicting resource assignments (e.g., high data rate offloading in low signal-to-noise ratio (SNR), high CPU allocation in erroneous code reception, etc.). Server-client communication procedures (e.g., information exchange between the local device and remote entities) may incorporate the dynamics of wireless links among the network entities (e.g., during the offloading decision-making process). Code partitioning and offloading procedures may be robust to errors in the wireless communication medium between the offloading (e.g., a source or local device) and offloaded (e.g., a remote device) entities.

Code partitioning at the local device and/or offloading of the corresponding tasks may be realized by configuring computation and/or transmission parameters. The configuration may be based on the system and/or communication medium characteristics. An acknowledgement procedure between the local device and the remote entity may adaptively update computation and/or transmission parameters.

The example architecture may include other functions, e.g., computation resource profiling and/or wireless medium information provisioning. The example architecture may be used at a local device and/or at a remote entity. If used at a remote entity, the Code Partitioner block may be removed. One or more modules of the offloading framework (e.g., a controller, a mobile agent, a partitioner, etc.) may partition an application (e.g., a video compression application) into multiple tasks (e.g., serializable tasks). The tasks may be distributed among various remote entities.

The local device (e.g., a WTRU) may determine whether and how to offload computation for an application. For example, the local device may determine service-level requirements for the application, where the service-level requirements comprise one or more of latency, reliability, and power consumption for processing.

The local device may determine wireless network conditions and/or local device conditions. The wireless network conditions may include information relating to the wireless medium, such as one or more of bandwidth, signal-to-noise ratio (SNR), latency, channel state information (CSI), packet error rate (PER), bit error rate (BER), interference profile of the channel, etc., for example The local device conditions may include information relating to computation resource information at the local device, such as the total and/or available processing power, total and/or available battery life, wired/wireless connectivity, information relating to other tasks/processes being performed by the local device, etc., for example.

The local device may determine to partition the application into one or more tasks, and compare a processing time of a task at the local device to a latency requirement of the task. For example, the latency requirement of the task may be determined by the local device (e.g., one or more of the functions described herein) and/or determined by the application. For example, the local device may obtain the latency requirement from the application (e.g., service-level). The latency requirement of the task may include an amount of time incurred to upload the task to a remote entity, an amount of time incurred to process the task at the remote entity, and/or an amount of time incurred to download the executed task once processed by the remote entity.

If the local device determines that the processing time of the local device would exceed the latency requirement of the task, then the local device may determine to offload the task. For example, the latency incurred once the local entity opts for offloading may include the total amount of time for the task upload, processing at the remote entity, and the time it takes to download the result processed at the remote entity. If the local device determines that the processing time of the local device would not exceed the latency requirement of the task, then the local device may compare a power consumed at the local device to offload the task to a power consumed at the local device to execute the task, where if the power consumed at the local device to offload the task is less than the power consumed (e.g., while satisfying the latency and reliability requirements of the task) at the local device to execute the task, then the local device may determine to offload the task. And if the local device determines that the power consumed at the local device to offload the task is greater than the power consumed (e.g., while satisfying the latency and reliability requirements of the task) at the local device to execute the task, then the local device may determine to execute the task locally.

Figure 4:
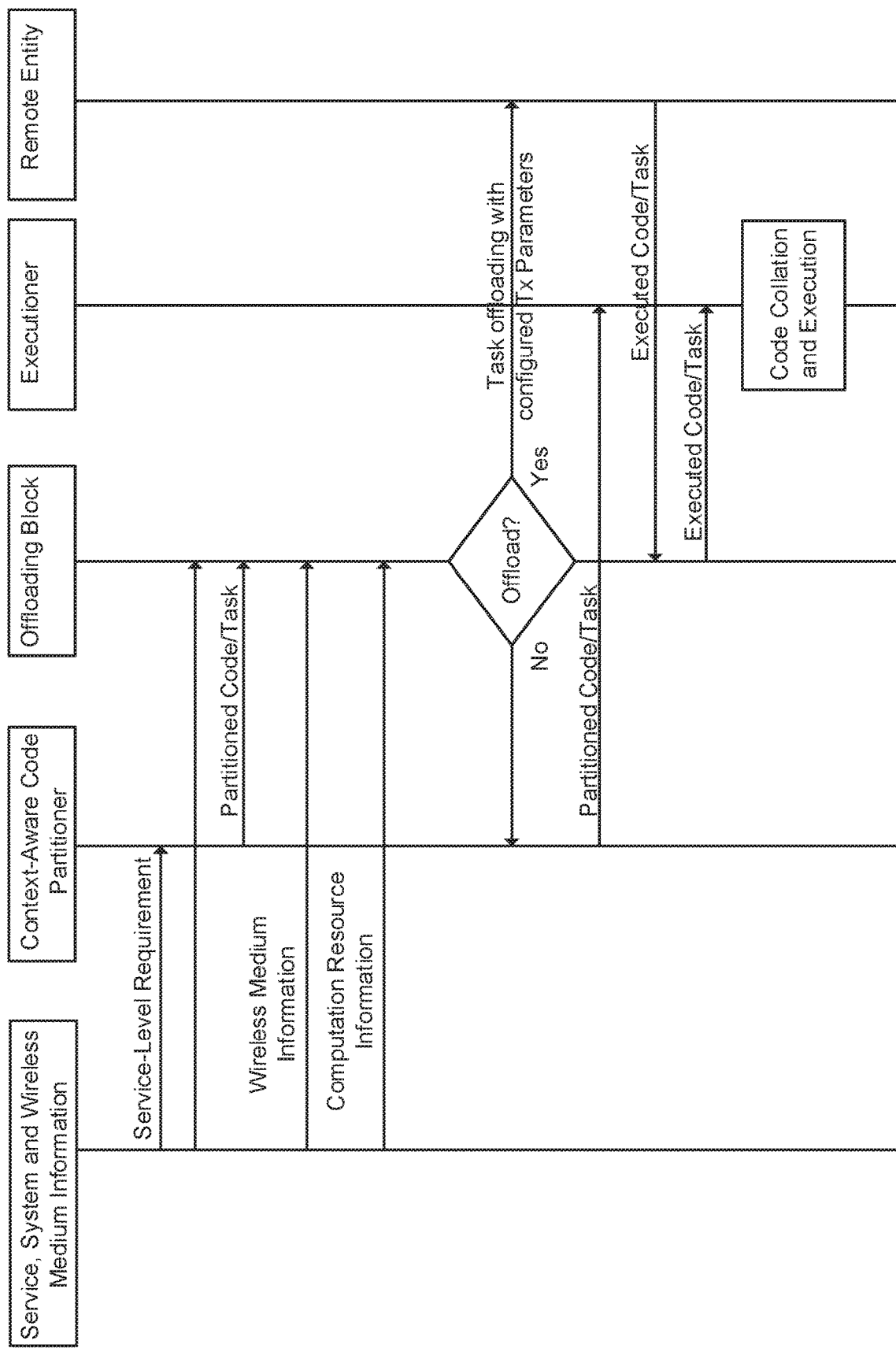
FIG. 4 depicts an example flow chart for task offloading.

FIG. 4 shows an example flow chart for task offloading. Service, system, and wireless medium information may provide service-level requirements for an application, wireless network conditions (e.g., wireless medium information), and/or local device conditions (e.g., computation resource information). The Code Partitioner may partition the application into one or more tasks. The Code Partitioner may have knowledge of the application context (e.g., be context-aware), which for example, may be used to determine how to partition the application into the one or more tasks.

The local device may use the wireless network conditions and/or local device conditions to determine whether to offload the task, for example, as described herein. The Offloading Block may determine to execute the task locally or offload the task. A task that is not offloaded may be sent to the Executioner for local processing (e.g., sent by the Code Partitioner).

The Offloading Block may receive inputs from the computation resource and/or wireless medium information blocks. The information blocks may be utilized in an offloading decision and/or system configuration. If the local device determines that remote execution is selected for the execution of the task, the Offloading Block may identify the system configuration and/or wireless transmission parameters (e.g., using the algorithms for identifying the parameters, for example, as described herein). The task may be sent/offloaded to a remote entity. The Offloading Block may receive the executed task from the remote entity. The output may be conveyed to the Executioner. In one or more examples, the task and the application execution flow may be combined (e.g., by the Executioner).

The local device may perform adaptive code offloading and/or wireless medium error handling. Errors in the wireless medium (e.g., due to fading or interference) may result in corrupted bit streams at the receiving end. In an offloading framework, erroneous reception of the offloaded tasks (e.g., code partitions) may result in execution latency and/or the termination of the application or tasks. The local device may employ techniques to identify errors in the received bits/packets corresponding to the offloaded task. For example, the local device may implement a form of robust transmission in the wireless medium, which for example, may utilize an acknowledgement procedure for error handling. The remote entity may perform adaptive computation resource optimization.

The offloading framework may configure and/or utilize system parameters. An example offloading, which may include retransmission, may be initiated by the local device, where one or more of the following may be performed. An offloading block may receive a Task i (Ti) from the output of the code partitioner. The Task i may be in raw format. The Offloading Block may convert the raw format into an offloading format. The conversion may involve converting the task into packets, which may be composition of bits transmittable over the wireless medium. The Offloading Block may configure the transmission parameters based on system and/or medium related values.

The local device may consider the bit size of the task. $b_i$ may represent the number of bits corresponding to Task i (Ti) in the offloading block.

An offloading indicator may be provided: $I_i \varepsilon (0,1)$, which may be the indicator for local (e.g., $I_i=0$) or remote/offloaded (e.g., $I_i=1$) execution of the task.

The local device may consider one or more wireless medium parameters. Examples of wireless medium parameters include, but are not limited to, channel state information ($h_{i,r}$), packet error rate (PER), bit error rate (BER), and/or interference profile of the channel ($h_{INT}$).

The local device may consider computing resource parameters, such as processing cycle at the local device ($f_{loc,i}$) and/or remote entity ($f_{rem,i}$).

The local device may consider reliability requirements of the task (e.g., the reliability of transmission for $T_i$ in the wireless medium ($\rho_{i,req}$)). The reliability requirements may be selected from a pre-determined set such as $\rho_{i,req} \varepsilon \{\rho_{i,min}, \ldots, \rho_{i,max}\}$. $\rho_{i,min}$ and $\rho_{i,max}$ may correspond to minimum and maximum reliability requirements, respectively. The total reliability may be a function of uplink ($\rho_{i,ul}$) and downlink wireless link reliabilities ($\rho_{i,dl}$).

The local device may consider the power consumption at the local device ($M_{loc,i}$). Such power consumption may include power consumed for uplink transmission (e.g., from device to remote entity) ($P_{ul,i}$), for downlink transmission (e.g., from remote entity to device) ($P_{dl,i}$), for local processing ($P_{loc,cpu,i}$), and/or for remote processing ($P_{rem,cpu,i}$).

The local device may consider the latency requirements of the task $T_i$ ($L_{i,req}$). These requirements may be associated with the latency incurred in one or more of the following: the uplink ($L_{ul,i}$) transmission, the downlink transmission ($L_{dl,i}$), the time spent during the CPU processing at the local device ($L_{cpu,loc,i}$), and/or the time spent during the CPU processing at the remote entity ($L_{cpu,rem,i}$). The CPU processing times $L_{cpu,loc,i}$ and $L_{cpu,rem,i}$ may be related (e.g., directly related) to the CPU.

The offloading block may determine (e.g., based on system and wireless medium parameters) whether to process the task locally or to offload the task to the remote entity.

Figure 5:
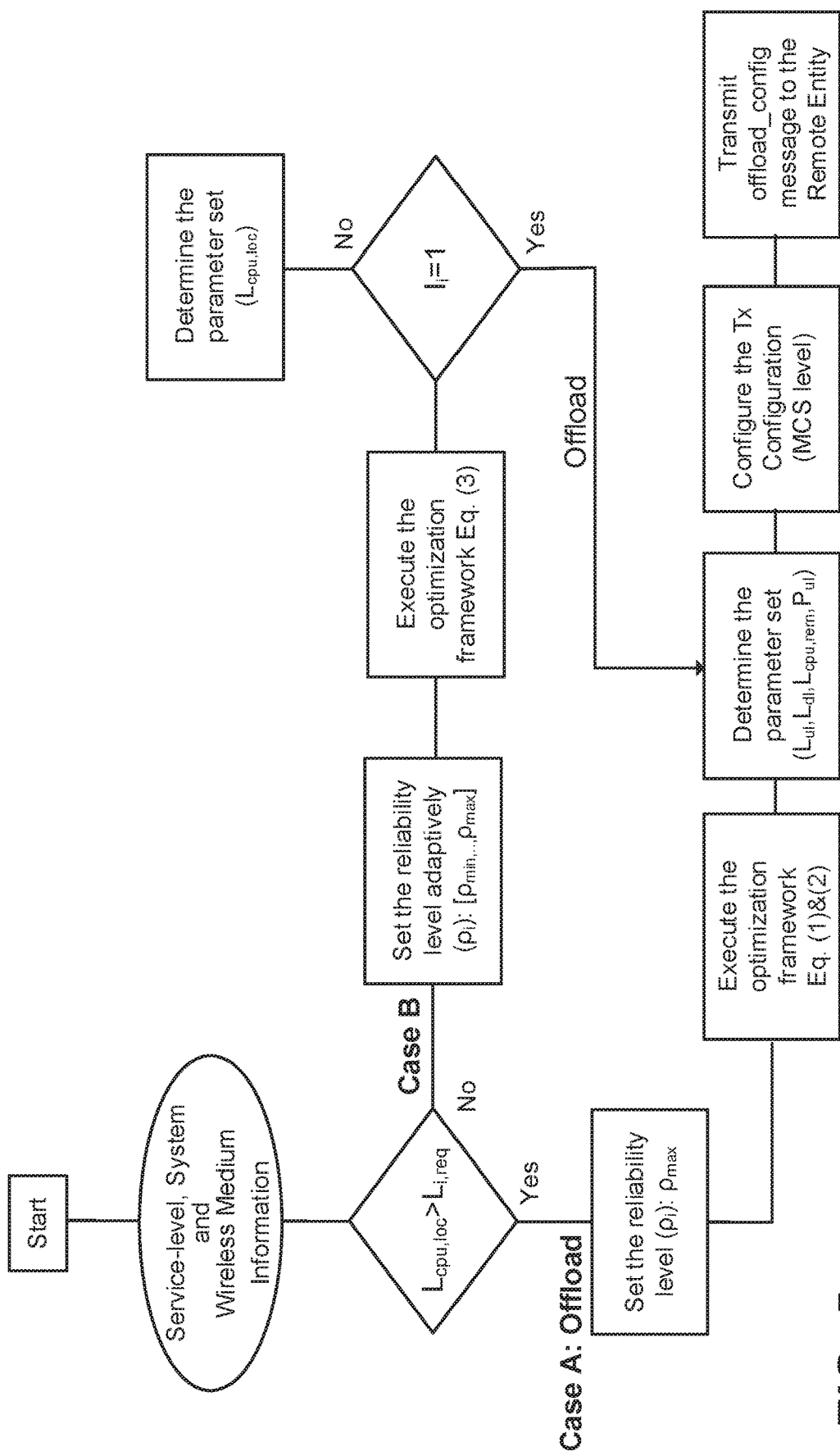
FIG. 5 depicts an example flow chart for task offloading at an offloading block.

FIG. 5 shows an example flow chart for task offloading at an offloading block. The offloading block may check the latency requirement $L_{i,req}$ of the task $T_i$, and compare it with local processing capabilities. Based on the comparison outcome, the actions performed by the offloading block may vary, for example, as illustrated below.

In example case A, if the time required to execute the task locally is more than the latency requirement of the task (e.g., $L_{cpu,loc} > L_{i,req} \rightarrow I_i=1$), the offloading block may activate (e.g., determine to offload the task). The task may be offloaded to the remote entity over the wireless medium. The offloading block may select a reliability requirement (e.g., a highest reliability requirement t ($\rho_{i,max}$), which may be associated with a highest level of reliability in the wireless medium). The offloading block may consider the uplink and downlink transmissions when configuring the transmission parameters (e.g., to meet the reliability requirement in the wireless transmission). The reliability constraint may be identified by the following adaptive coding abstraction. Parameters such as signal-to-noise ratio (SNR) and/or uplink/downlink channel state information (CSI) may be taken into account.

$$\rho_{i,ul} = PR(W \log(1 + h_{ul} P_{ul}) \geq b_i \backslash L_{ul})$$

$$\rho_{i,dl} = Pr(W \log(1 + h_{dl} P_{dl}) \geq b_i \backslash L_{dl}) \quad \text{Eq. (1)}$$

$$\text{Select}(L_{ul}, L_{dl}, L_{cpu,rem}, P_{ul}) \quad \text{Eq. (2)}$$

such that $P_{loc,i} \rightarrow \text{Min } P_{loc,i}$; $L_{ul} + L_{dl} + L_{cpu,rem} \leq L_{i,req}$; $\rho_{ul} \cdot \rho_{i,dl} \leq \rho_{i,max}$. The offloading block may determine one or more of the following: the uplink and/or downlink transmission duration of the task; the computation time at the remote entity for the execution of the task; minimum uplink transmission power (e.g., so that the parameters jointly satisfy the latency requirement ($L_{i,req}$) and/or that the uplink and downlink transmissions are under a reliability class ($\rho_{i,max}$)). The parameters in Eq. (2) may be determined by the offloading block (e.g., by taking the constraints in Eq. (1) and Eq. (2) into account). The reliability of the offloading may be a combination of the wireless medium transmission reliability (e.g., as in Eq. (1)), and/or the service level reliability of the task $T_i$, $\rho_{SL,i}$. The overall reliability requirement in Eq. (2) may be a function of one or both of the aforementioned reliability requirements (e.g., $\rho_{i,ul} \cdot \rho_{i,ul} \geq \max\{\rho_{i,max}, \rho_{SL,i}\}$). The parameters in Eq. (2) may be identified and/or updated based on the set of reliability constraints.

With respect to transmit configuration, the configuration set Eq. (2) determined by the offloading block (e.g., $P_{ul}$) may be mapped to a corresponding MCS scheme at the local device uplink transmission. The MCS scheme may be denoted as $MCS_{ul}$. The bit stream of $T_i$ may be encoded with $MCS_{ul}$. The bit stream may be transmitted over the wireless medium within a duration $L_{ul}$. The processed task $T_i$ at the remote entity may be transmitted from the remote entity to the local device in the downlink. The time allocated for such transmission may be denoted as $L_{dl}$. This information may be conveyed from the local device to the remote entity (e.g., via an offload configuration message) along with other parameters.

With respect to processing power configuration (e.g., CPU configuration), the optimization of the parameters given in Eq. (2) may provide resource provisioning for the processing power. For example, the resource provisioning may be performed as a function of CPU power allocated for task $T_i$. The CPU power allocated at the remote entity, $L_{cpu,rem}$, may be the CPU time requested to be configured at the remote entity for $T_i$. The local device may send this parameter to the remote entity within the offload_config message, for example.

The remote entity may send information about the power (e.g., CPU power) it could allocate for the task $T_i$ to the local device, for example, in advance. The information may be sent through a configuration message (e.g., the $CPU_{rem}$ remote_resource message). The local device may use the information in identifying the corresponding system configuration parameters (e.g., as in Eq. (2)). There may be an upper bound on the power (e.g., CPU power) that the remote entity may allocate for task $T_i$. The configuration parameters of Eq. (2) may be determined by putting additional constraint on the remote entity power provision (e.g., CPU provision).

In example case B, the local processor may be able to execute the task within the latency requirement (e.g., $L_{cpu,loc} < L_{i,req} \rightarrow I_i = 0$ or 1). The task may be executed locally or offloaded. The determination may be made upon considering the system and/or wireless medium conditions. For example, offloading of the task may be selected if the total power consumed at the local device is lower compared to executing the task locally at the device.

The system and/or wireless parameter configuration in example case B may be similar to that in example case A. The optimization framework may include the option for local execution. The optimization performed by the offloading block may be illustrated by the following.

$$\text{Select}(I_i, L_{dl}, L_{cpu,loc}, L_{cpu,rem}, P_{ul}) \quad \text{Eq. (3)}$$

such that $$\min\{(1-I_i)P_{loc,cpu} + I_i P_{ul}\}; \ I_i(L_{ul} + L_{dl} + L_{cpu,rem}) + (1 I_i) L_{cpu,loc}; \ \rho_{i,ul} \cdot \rho_{i,dl} \geq \rho_{i,req}.$$

The offloading block may make one or more determinations including, for example, whether to offload the task ($T_i$), the uplink and/or downlink transmission duration of the task, local and remote computation time for the execution of the task, uplink transmission power, and/or minimum total power at the local device corresponding to $T_1$. The constraints of the parameters may jointly satisfy the latency and reliability requirements. The reliability of the offloading procedure, $\rho_{i,req}$, may be set-up by the service level requirement and/or the parameters (e.g., system and/or wireless medium parameters). If bit-error-rate (BER) of the wireless link between the local and remote devices is above a threshold (e.g., $BER_{th}$), the offloading block may select a high reliability requirement. If the BER is low, the offloading block may select a lower reliability requirement. The lower reliability may result in lower transmission time in wireless transmissions. Corresponding CPU allocation times at the local and/or remote devices may also be lower.

The transmit configuration and/or processing power (e.g., CPU) configuration may depend on the offloading decision parameter $I_i$. For example, if the value $I_i$ of is 1, it may indicate that the offloading mechanism is enabled for the task and that transmit and remote CPU provisioning configurations may follow similar steps as discussed in the example case A. If the value of $I_i$ is 0, it may indicate that local processing is enabled and that the task may be executed locally with the CPU provisioning of the task determined by $P_{loc,cpu}$, for example.

The offloading framework may enable a flexible assignment of reliability requirements. The assignment may be on a per task basis. The reliability requirement may be determined based on the service level requirement of the task, the reliability requirement of the wireless medium, and/or a combination of both. Lower reliability constraint on the wireless transmission may incur error in the uplink and/or downlink transmission. An acknowledgement and retransmission procedure may be developed for the offloading framework.

The offloading framework may call for remote execution of the task $T_i$ (e.g., $I_i = 1$). An error handling mechanism may be implemented. The following mechanism may be used to trigger retransmission or local execution of the task, e.g., when an event or error is detected in the wireless channel between the local device and remote entity. The remote entity may send feedback to the local entity. The feedback may include wireless transmission parameters e.g., updated latency requirements) and/or system parameters (e.g., power and/or CPU resources). The local device may determine whether to retransmit the tasks for remote execution (e.g., with updated CPU resource and/or wireless transmission parameter configuration) or to execute the tasks locally. The determination may be based on the requirements of the tasks including, for example, latency, reliability, and/or system parameters (e.g., wireless channel conditions such as CSI, local and remote computation resources, etc.). The local device may inform the remote entity regarding updated resource requests such as CPU allocation and/or transmission time. The error scenario in the uplink channel (e.g., the channel of transmission from the local device to remote entity) may be considered. NACK feedback due to erroneous reception may be conveyed in the downlink (e.g., from the remote entity to the local device).

An example retransmission implementation may be provided. The local device offloading block may transmit the task to the remote entity with one or more parameters including ($I_i$, $L_{ul}$, $L_{dl}$, $L_{cpu,loc}$, $L_{cpu,rem}$, $P_{ul}$). The parameters may be determined as described herein. If the offloading block opts for remote execution and sends the task over the wireless medium, the parameters may be selected as $I_i=1$ and $L_{cpu,loc}=0$. A timer corresponding to the task (denoted as $L_{Ti}$) may be started at the output of the task partitioner or when the whole task is transferred into the offloading block. $L_{Ti}$ may determine the time consumed since the beginning of the task execution (including the offloading procedure). The time consumed may be within the latency constraint of the task, $L_{req,i}$.

The remote entity may check the received stream to identify error(s) incurred during the transmission. Reed-Solomon codes may be used to determine such errors. If the errors cannot be corrected in the decoding phase, the remote entity may send a NACK message to the local device. The NACK message may indicate the errors. The NACK message may include additional information about the computing resources at the remote device. The computer resources may be utilized in the next retransmission for the task. The NACK message may include one or more of the following: an NACK header/identifier, the CPU resources (e.g., in terms of the duration that the remote entity may allocate in the next retransmission $L_{rem,irtx}$), updated wireless channel measurement results (e.g., CSI, interference level, BER, etc.).

The local device may receive the NACK packet. The local device may check the current timer, $L_{Ti}$, of the task $T_i$ to identify the time left for execution within the task latency constraint (e.g., whether $L_{Ti}<L_{req,i}$ or $L_{Ti}>L_{req,i}$). If $L_{Ti}$ is less than $L_{req,i}$, the local device may initiate re-computation of one or more of the parameters ($I_i$, $L_{ul}$, $L_{dl}$, $L_{cpu,loc}$, $L_{cpu,rem}$, $P_{ul}$) with an updated time constraint $L_{ul}L_{dl}+L_{cpu,rem}\leq L_{i,req}-L_{Ti}$. The updated time constraint may demonstrate the time for execution of the task that may satisfy the latency constraint. The parameter configuration framework given in Eq. (3) may be updated and performed as follows.

$$\text{Select}(I_i, L_{ul}, L_{dl}, L_{cpu,loc}, L_{cpu,rem}, P_{ul}) \qquad \text{Eq. (4)}$$

such that $\min\{(1-I_i)P_{loc,cpu}+I_iP_{ul}\}$; $I_i(L_{ul}+L_{dl}+L_{cpu,rem})+(1-I_i)L_{cpu,loc}\leq L_{i,req}-L_{Ti}$; $\rho_{i,ul}\cdot\rho_{i,dl}\geq\rho_{i,max}$.

At a retransmission step (e.g., at each retransmission step), the CPU allocation provisioning at the remote entity for the new offloading step may change. The change may be due to the time consumed during the previous uplink and downlink transmission. If an offloading decision is made at the offloading block after the NACK message reception, the local device may inform the remote entity with the updated remote CPU allocation request $L_{cpu,rem}^*$. The information may be part of the offloaded code. The information may be transmitted in a separate transmission slot before the remote execution of the task. The offloading block may run the configuration framework and determine the parameters.

Figure 6:
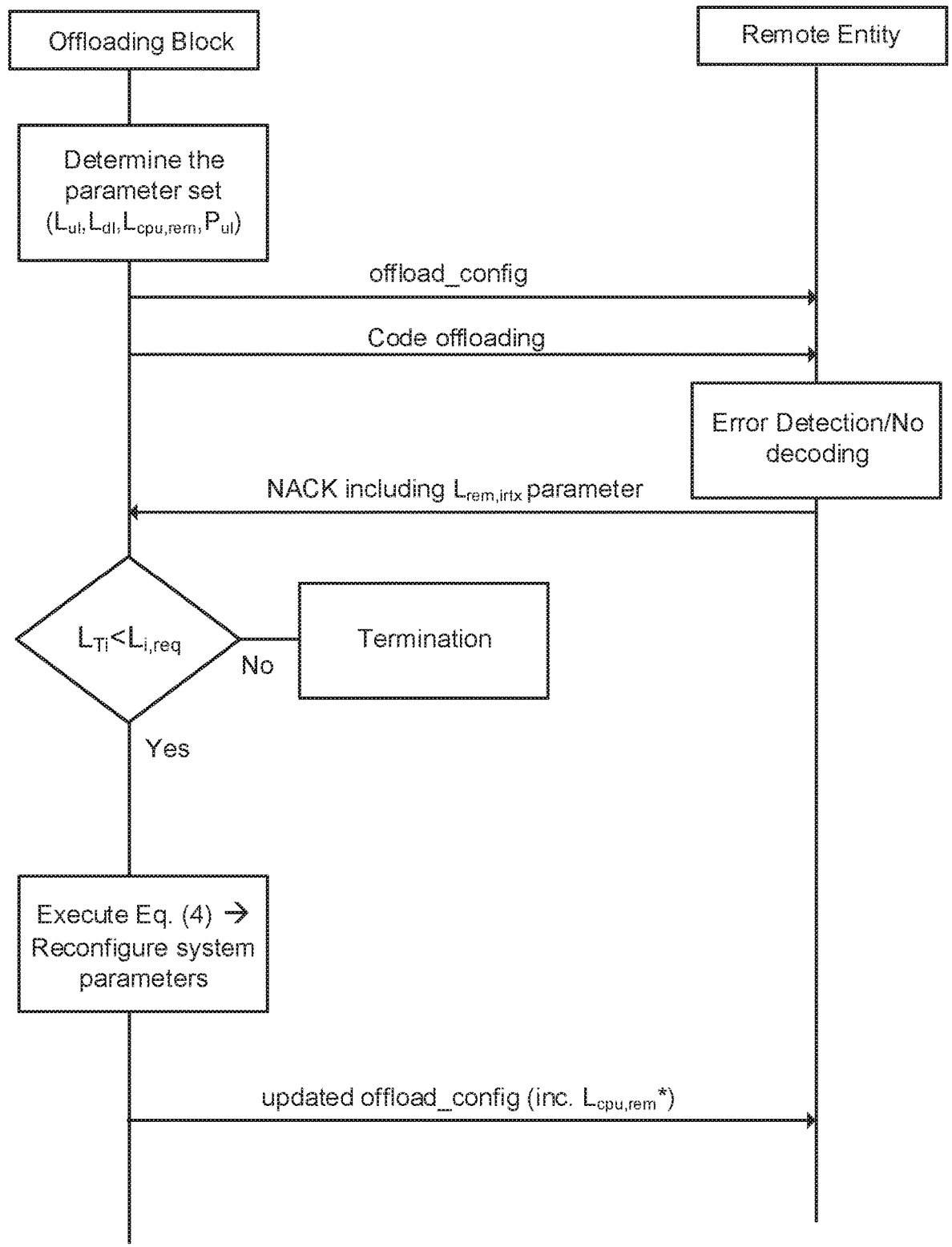
FIG. 6 depicts an example flow chart for task offloading at an offloading block with acknowledgment.

FIG. 6 shows an example flow chart for task offloading at an offloading block with acknowledgment. A processing power (e.g., CPU) configuration/acknowledgment implementation may be implemented for a retransmission. One or more of the following may apply. An initial configuration may be set as in Eq. (4). The local device may receive a NACK message. The local device may check the task timer, $L_{Ti}$. If offloading is enabled, the offloading block may inform the remote entity with a CPU power provisioning request (e.g., via the updated upload_config message). In an option, the remote entity may send a feedback message to confirm or reject the request (e.g., via a CPU_prov_ACK message). The offloading block may proceed with reconfiguring the transmission parameters based on the latest configuration framework. The offloading block may adaptively select reliability requirement for a retransmission (e.g., each retransmission), $\rho_{i,req}$. The offloading block may update system configuration parameters. The reliability requirement of a transmission (e.g., each transmission) may be determined adaptively based on the service level requirement and/or the reliability request at the wireless medium given a set of configuration parameters (e.g., ($I_i$, $L_{ul}$, $L_{dl}$, $P_{ul}$)).

An example retransmission implementation for the downlink erroneous reception may be provided. The local device may detect errors in the message that may not be correctable. The local device may send a NACK to the remote entity. The remote entity may retransmit the executed task in the downlink with higher reliability in the downlink channel. In an option, the required reliability level for the downlink transmission may be provided to the remote entity by the local device. The local device may identify this parameter by considering the remaining time for the task execution: $L_{i,req}-L_{Ti}$. The reliability level may be obtained by assuming adaptive modulation in the downlink, which may be abstracted as follows.

$$\rho_{i,dl}=Pr(W\log(1+h_{dl}P_{dl})\geq b_i L_{dl}^*) \qquad \text{Eq. (4)}$$

$L_{dl}^*$ may denote the updated downlink transmission time. The transmission time may be re-calculated based on the remaining task execution time $L_{i,req}-L_{Ti}$.

The offloading framework may identify the system configuration and/or wireless transmission parameters for the initial transmit opportunity and/or the retransmission opportunities. Optimization and configuration may be carried out as in Eq. (3). Retransmission may be performed due to potential errors in the wireless link. The framework may identify the parameters before an error event occurs in the wireless link. The offloading block may inform the remote entity about offloading characteristics during the task execution (e.g., whether the task will be offloaded or executed locally, the requested remote CPU resources, downlink and uplink transmit durations, etc.) in various transmit opportunities. The parameters may be related to the potential wireless link errors. An average statistics may be determined at the local device and/or remote entity.

Figure 7:
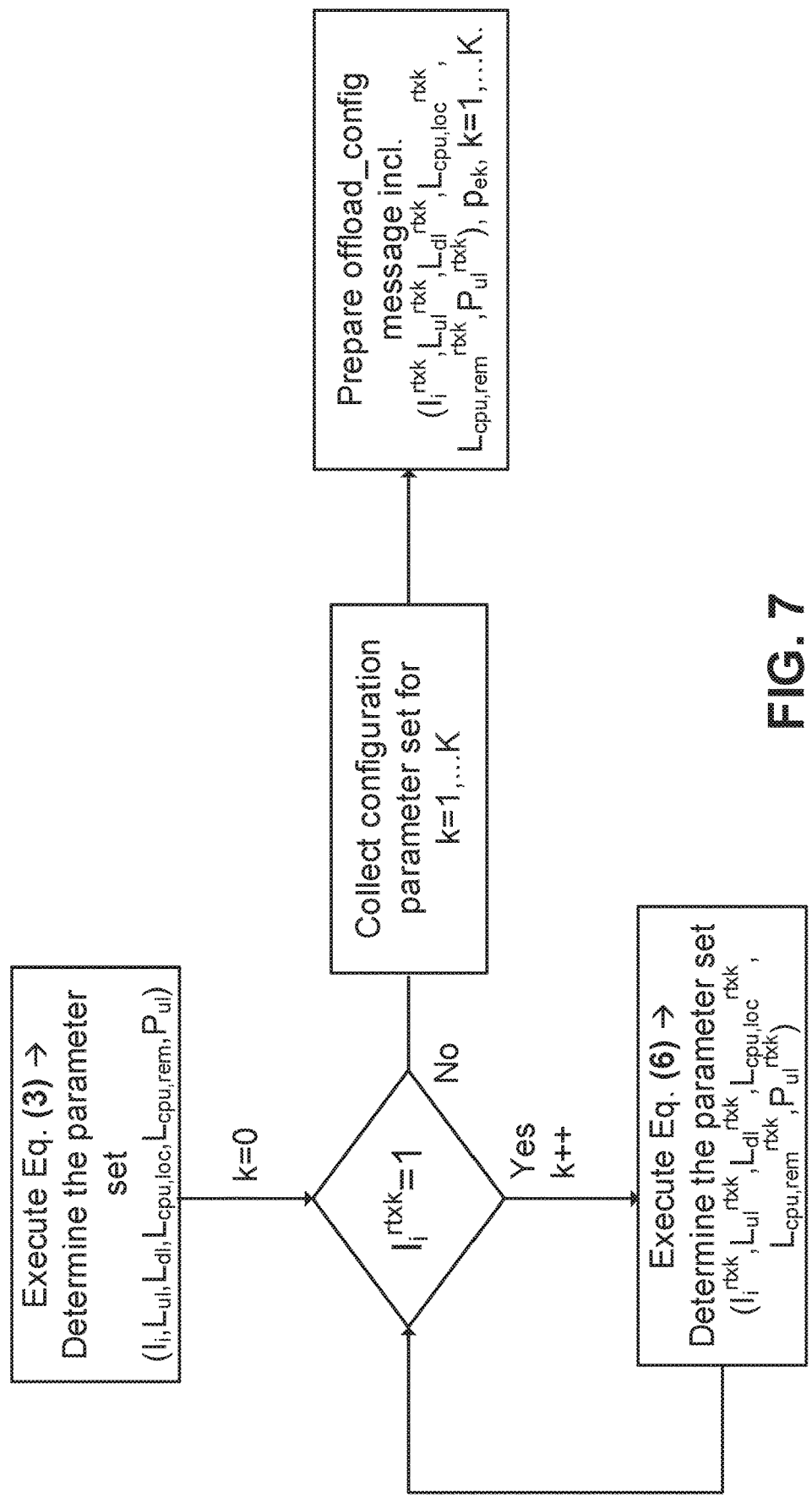
FIG. 7 depicts an example flow chart for task offloading with system configuration parameter provisioning.

With a resource provision request during a transmit opportunity (e.g., each transmit opportunity), the remote entity may provision its resources (e.g., CPU power) and/or transmit the configuration in advance for resource configuration. For example, the resource provision request may be ($I_i$, $L_{ul}$, $L_{dl}$, $L_{cpu,loc}$, $L_{cpu,rem}$, $P_{ul}$) for an original transmission, ($I_i^{rtx1}$, $L_{ul}^{rtx1}$, $L_{dl}^{rtx1}$, $L_{cpu,loc}^{rtx1}$, $L_{cpu,rem}^{rtx1}$, $P_{ul}^{rtx1}$) for retransmission opportunity 1, and/or ($I_i^{rtxi}$, $L_{ul}^{rtxi}$, $L_{dl}^{rtxi} L_{cpu,loc}^{rtxi}$, $L_{cpu,rem}^{rtxi}$, $P_{ul}^{rtxi}$) for retransmission opportunity i. The parameters for the provisioning of resources in a retransmission opportunity (e.g., each retransmission opportunity) may be computed. FIG. 7 shows an example flow chart for task offloading with system configuration parameter provisioning.

With respect to transmit opportunity 1 (e.g., an original transmission), ($I_i$, $L_{ul}$, $L_{dl}$, $L_{cpu,loc}$, $L_{cpu,rem}$, $P_{ul}$) may be selected with the constraint in Eq. (4). Local or remote execution (e.g., $I_i$=0 or 1) may be identified. Feedback of the parameters $L_{cpu,rem}$, $L_{dl}$ may be included. With respect to transmission opportunity 2 (e.g., a first retransmission opportunity), the retransmission may occur when offloading is performed in transmit opportunity 1 (e.g., $I_i$=1) and an error occurs in the uplink of the transmission, $p_{el}$ (e.g., $p_{el}$ may denote the probability of an error event in the uplink transmission). The error event may refer to packet error rate, a function of bit error rate, or a combination of both. The system configuration and/or wireless parameters may be determined by the offloading entity (e.g., assuming $I_i$=1 and an uplink error event occurred) as the following.

$$\text{Select}(I_i^{rtx1}, L_{ul}^{rtx1}, L_{dl}^{rtx1}, L_{cpu,loc}^{rtx1}, L_{cpu,rem}^{rtx1}, P_{ul}^{rtx1}) \qquad \text{Eq. (5)}$$

such that $\min\{(1-I_i^{rtx1})P_{loc,cpu}^{rtx1} + I_i^{rtx1}P_{ul}^{rtx1}\}$; $I_i^{rtx1}(L_{ul}^{rtx1} + L_{dl}^{rtx1} + L_{cpu,rem}^{rtx1}) + (1-I_i^{rtx1})L_{cpu,loc}^{rtx1} + L_{NACK} \leq L_{i,req} - L_{ToT1}$; $\rho_{i,ul}^{rtx1} \cdot \rho_{i,ul}^{rtx1} \geq \rho_{i,req}$. $L_{NACK}$ may refer to the time spent in successful reception of the NACK message at the local device. The NACK message may be sent by the remote entity. $L_{ToT1}$ may refer to the total time spent in the first offloading transmit opportunity. The output of Eq. (6) may demonstrate whether offloading will be performed (e.g. $I_i$=0 or 1). The output of Eq. (6) may demonstrate the resources that will be requested at the remote entity, ($L_{dl}^{rtx1}$, $L_{cpu,rem}^{rtx1}$), if an error event occurs, for example.

The retransmission parameters ($I_i^{rtx1}$, $L_{dl}^{rtx1}$, $L_{cpu,rem}^{rtx1}$) and/or the probability of an error event in the uplink transmission, $p_{el}$, may be included in a configuration message (e.g., the offload_config message). The configuration message may contain the parameters included in the original transmission (e.g., ($I_i$, $L_{ul}$, $L_{dl}$, $L_{cpu,loc}$, $L_{cpu,rem}$, $P_{ul}$)). The message may be conveyed from the local device to the remote entity before the task is transmitted in the uplink channel. The remote entity may receive these parameters. The remote entity may provision its resources accordingly pertaining to transmit opportunity 1 and transmit opportunity 2. System configuration and/or wireless parameters may be obtained in an iterative fashion similar to the procedure described in Eq. (6). The system configuration and/or wireless parameters may include ($I_i^{rtx2}$, $L_{ul}^{rtx2}$, $L_{dl}^{rtx2}$, $L_{cpu,loc}^{rtx2}$, $L_{cpu,rem}^{rtx2}$, $P_{ul}^{rtx2}$), . . . , ($I_i^{rtxk}$, $L_{ul}^{rtxk}$, $L_{dl}^{rtxi}$, $L_{cpu,loc}^{rtxk}$, $L_{cpu,rem}^{rtxk}$, $P_{ul}^{rtxk}$) for the retransmissions rtx2, . . . , rtxk, where rtx2, . . . , rtxk may correspond to the transmission opportunities 2, . . . , k, respectively.

Figure 8A:
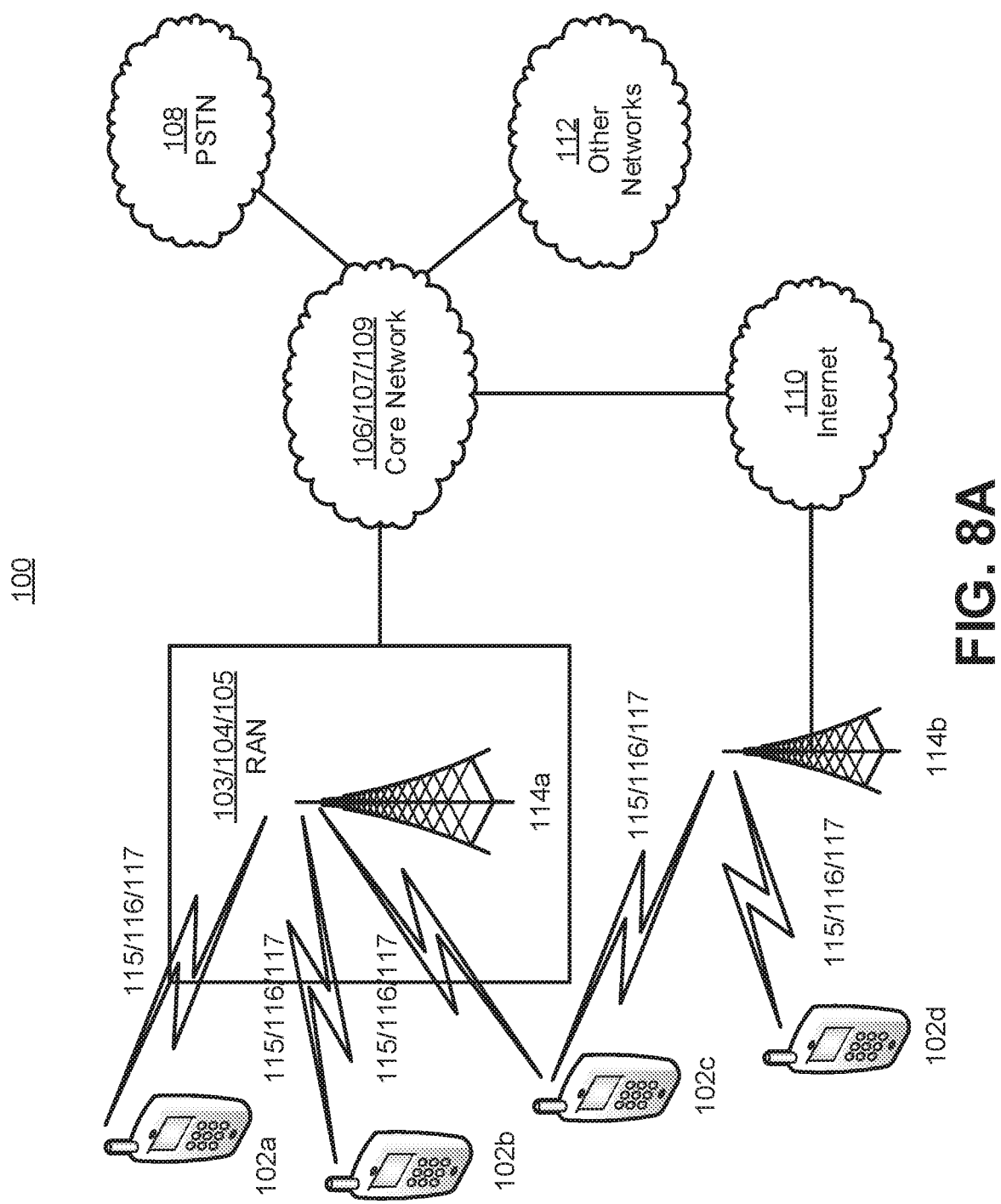
FIG. 8A depicts a diagram of an example communications system in which one or more disclosed embodiments may be implemented.

FIG. 8A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 100 may include wireless transmit/receive units (WTRUs) 102a, 102b, 102c and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. A DASH client may be run on a WTRU.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 8A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A) to establish a picocell or femtocell. As shown in FIG. 8A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 8A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 8A may be configured to communicate with the base station 114a, which may employ a cellular-based radio technology, and with the base station 114b), which may employ an IEEE 802 radio technology.

Figure 8B:
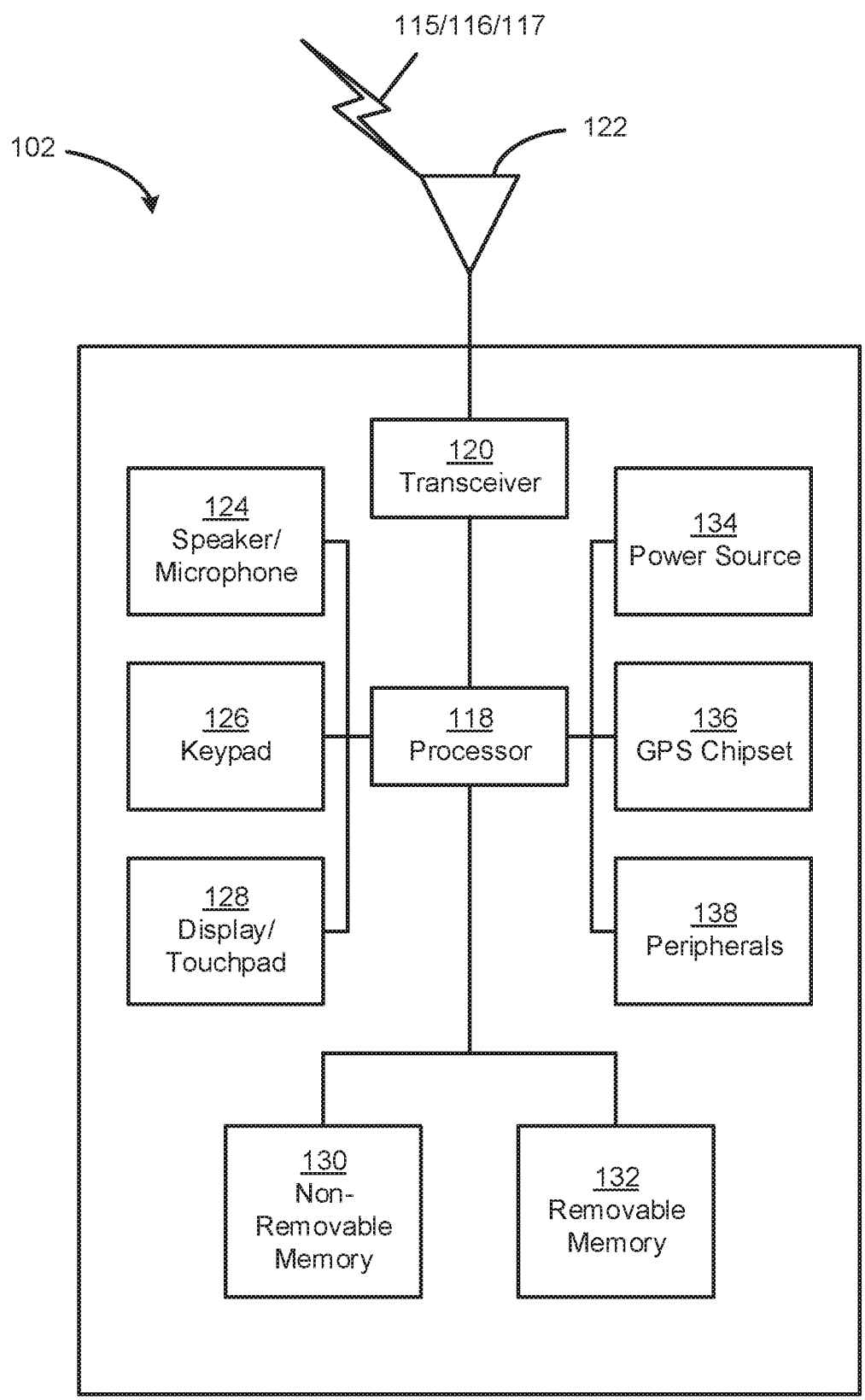
FIG. 8B depicts a system diagram of an example wireless transmit/receive unit (WTRU) that may be used within the communications system illustrated in FIG. 8A.

FIG. 8B is a system diagram of an example WTRU 102. As shown in FIG. 8B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 8B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 8B as a single element, the WTRU 102 may include any number of transmit/receive elements 122. More specifically, the WTRU 102 may employ MIMO technology.

Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8C:
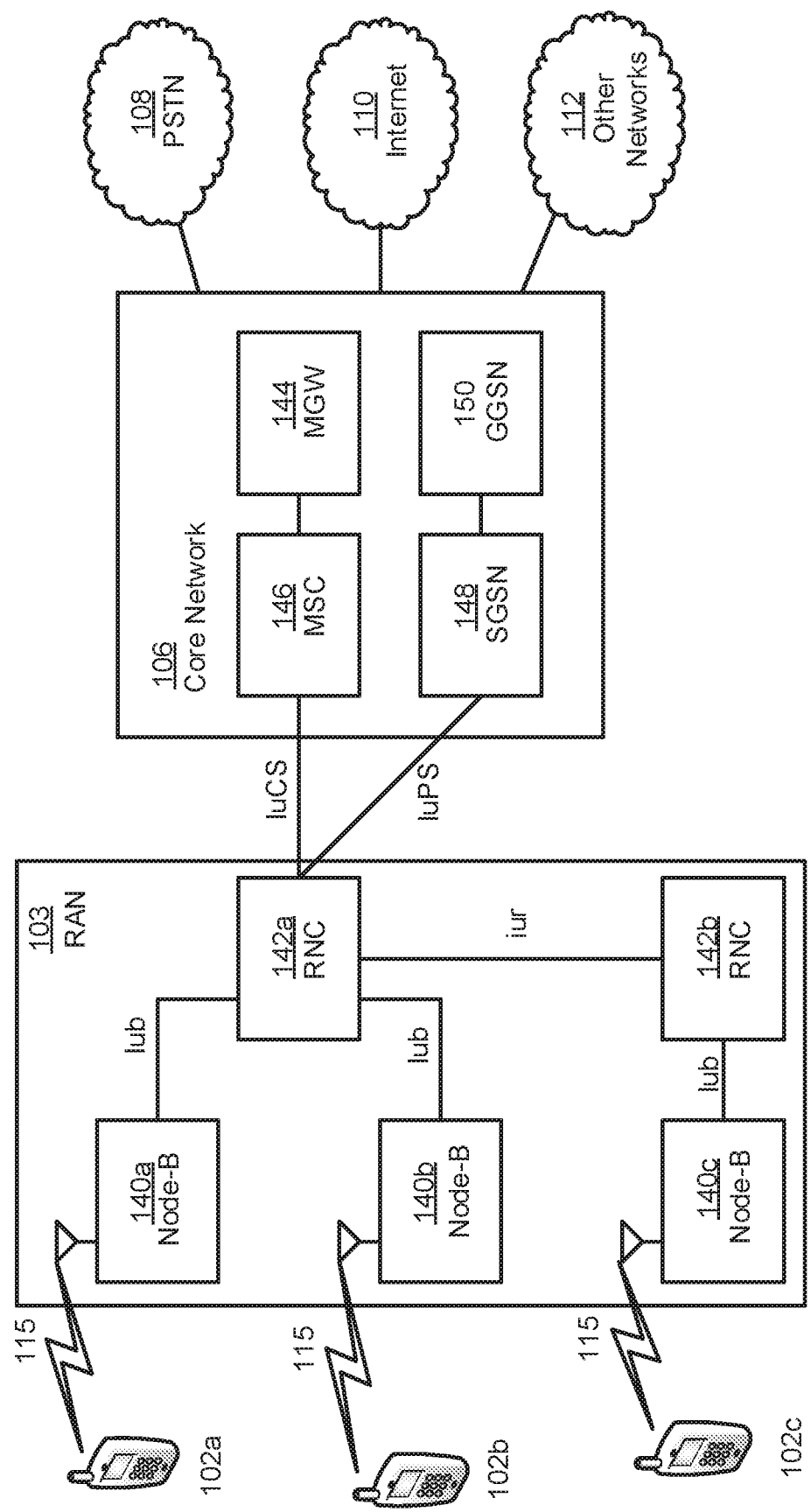
FIG. 8C depicts a system diagram of an example radio access network and an example core network that may be used within the communications system illustrated in FIG. 8A.

FIG. 8C is a system diagram of the RAN 103 and the core network 106 according to an embodiment. The RAN 103 may employ a UTRA radio technology to communicate with the WTRUs 102a, 102b, 102c over the air interface 115. The RAN 103 may also be in communication with the core network 106. As shown in FIG. 8C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 8C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 8C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an InCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 8D:
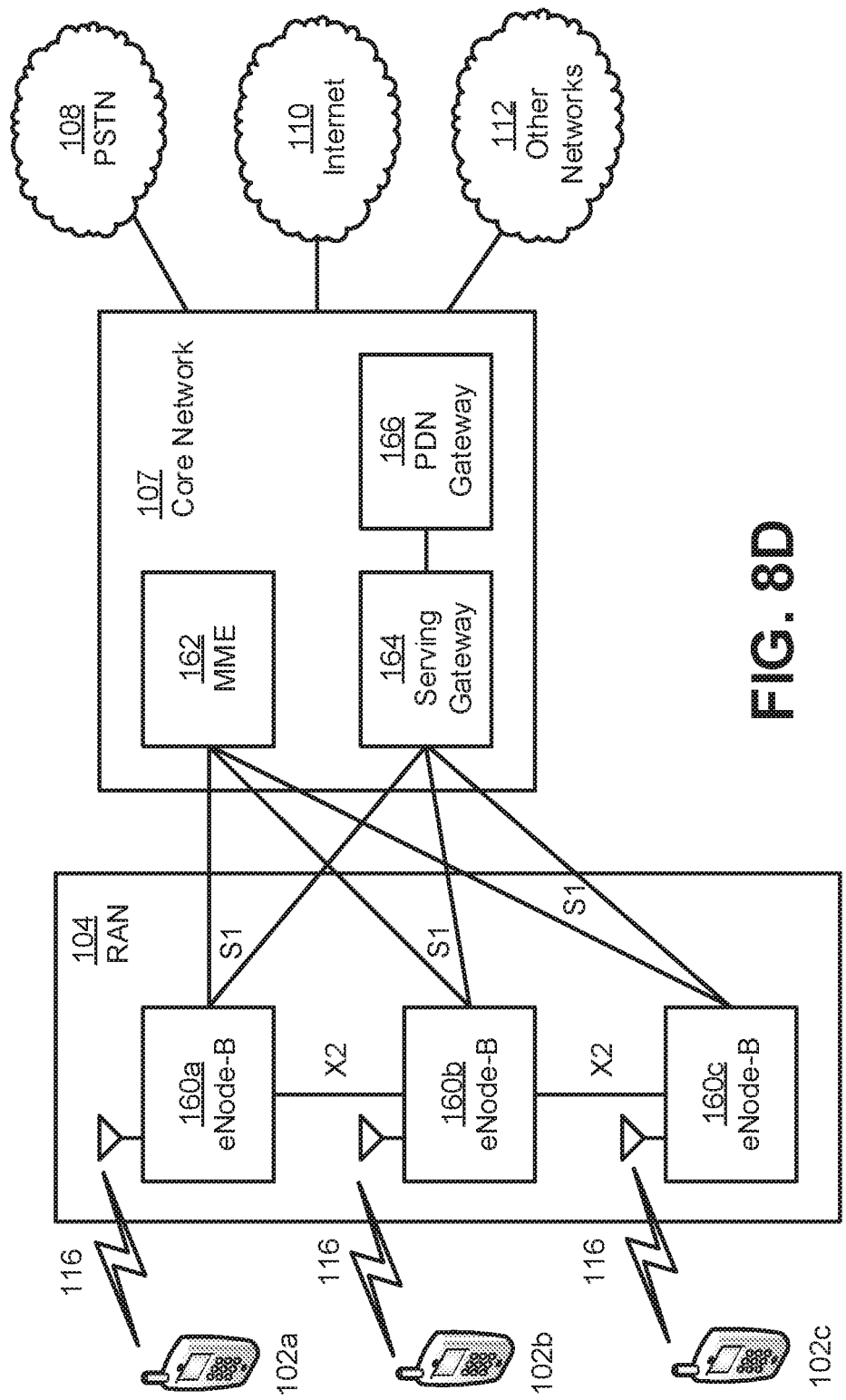
FIG. 8D depicts a system diagram of another example radio access network and an example core network that may be used within the communications system illustrated in FIG. 8A.

FIG. 8D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 8D, the eNode-Bs 160a, 160b, 160c may communicate with one another over an X2 interface.

The core network 107 shown in FIG. 8D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 8E:
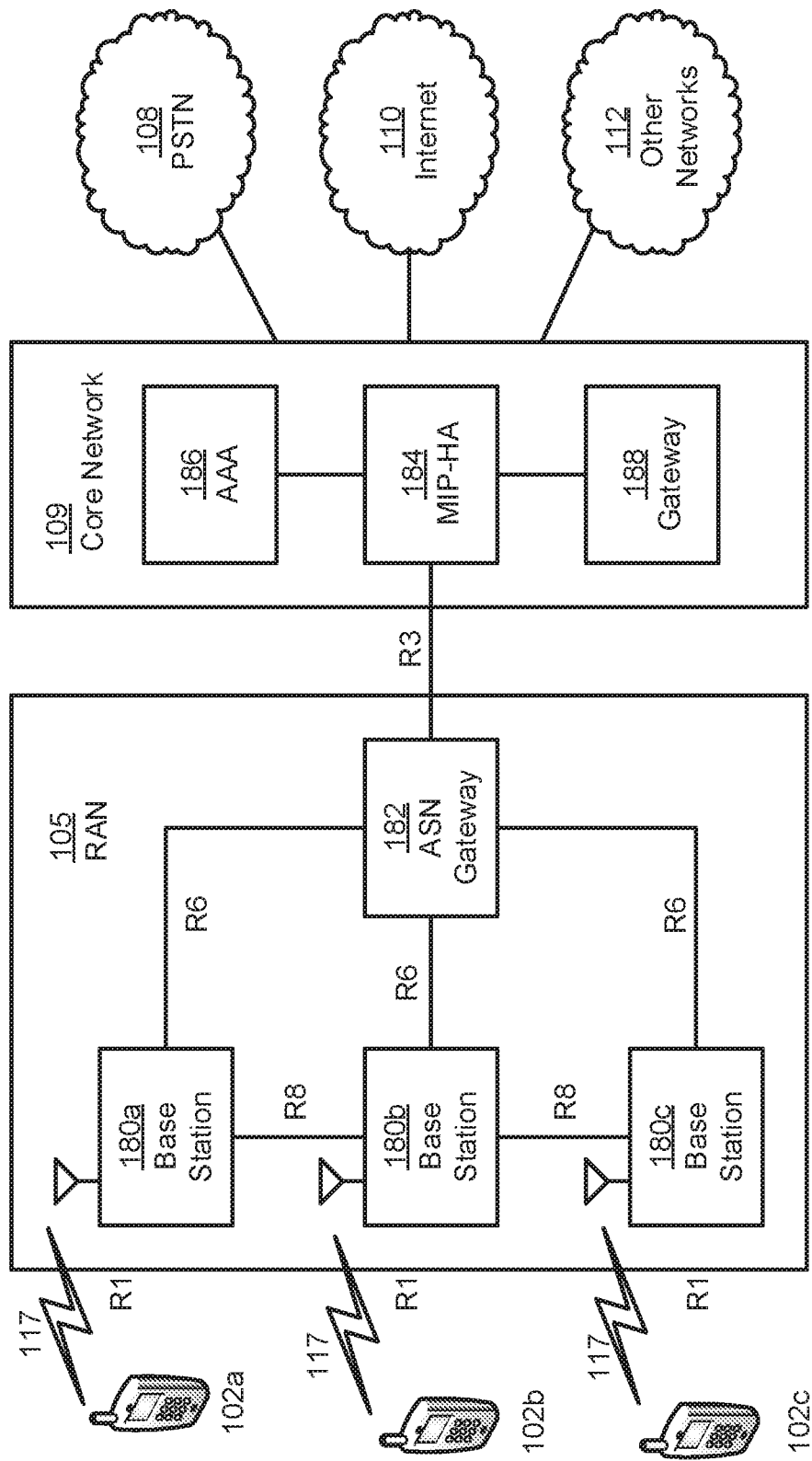
FIG. 8E depicts a system diagram of another example radio access network and an example core network that may be used within the communications system illustrated in FIG. 8A.

FIG. 8E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 8E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 8E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 8E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

The invention claimed is:

1. A wireless transmit/receive unit (WTRU) in a wireless network, comprising:
    a memory; and
    a processor configured to:
        receive a first message, wherein the first message indicates service-level requirements associated with an application, wherein the service-level requirements comprise a latency requirement, a reliability requirement, and an offload power consumption requirement;
        determine that a wireless network condition exists, wherein the wireless network condition is associated with the wireless network and indicates at least one of a signal-to-noise ratio, a channel state information, a packet error rate, a bit error rate, or an interference profile of a channel;
        determine that a local device condition exists, wherein the local device condition is associated with the WTRU and indicates at least one of total available processing power, total battery life, or wireless connectivity;
        partition the application into a first task and a second task;
        determine that the first task is to be executed on the WTRU based on the latency requirement, the reliability requirement, the offload power consumption requirement, the wireless network condition, and the local device condition;
        determine that the second task is to be offloaded to a remote entity for execution based on the latency requirement, the reliability requirement, the offload power consumption requirement, the wireless network condition, and the local device condition;
        execute the first task on the WTRU based on the determination that the first task is to be executed by the WTRU;
        send, based on the determination that the second task is to be offloaded, a second message to the remote entity, wherein the second message requests that the remote entity execute the second task; and
        receive a third message from the remote entity, wherein the third message comprises data associated with the executed second task, wherein the second task is to be combined with the first task.

2. The WTRU of claim 1, wherein the processor is further configured to send wireless transmission parameters for the offloading of the second task to the remote entity.

3. The WTRU of claim 1, wherein the processor is further configured to convert the second task into packets to be transmitted over the wireless network.

4. The WTRU of claim 1, wherein the processor is further configured to configure a processor power and wireless transmission parameters at the WTRU based on the reliability requirement.

5. The WTRU of claim 1, wherein the third message is a non-acknowledgement (NACK) message if one or more errors are incurred during the offloading of the second task.

6. The WTRU of claim 5, wherein, upon receipt of the NACK message for the second task, the processor is further configured to reconfigure the service-level requirements for the application.

7. The WTRU of claim 6, wherein the processor is further configured to send the reconfigured service-level requirements to the remote entity.

8. A method, comprising:
    receiving a first message, wherein the first message indicates service-level requirements associated with an application for a wireless transmit/receive unit (WTRU) in a wireless network, wherein the service-level requirements comprise a latency requirement, a reliability requirement, and an offload power consumption requirement;
    determining that a wireless network condition exists, wherein the wireless network condition is associated with the wireless network and indicates at least one of: a signal-to-noise ratio, a channel state information, a packet error rate, a bit error rate, or an interference profile of a channel;
    determining that a local device condition exists, wherein the local device condition is associated with the WTRU and indicates at least one of: total available processing power, total battery life, or wireless connectivity;
    partitioning the application into a first task and a second task;
    determining that the first task is to be executed on the WTRU based on the latency requirement, the reliability requirement, the offload power consumption requirement, the wireless network condition, and the local device condition;
    determining that the second task is to be offloaded to a remote entity for execution based on the latency requirement, the reliability requirement, the offload power consumption requirement, the wireless network condition, and the local device condition;
    executing the first task on the WTRU based on the determination that the first task is to be executed by the WTRU;
    sending, based on the determination that the second tasks is to be offloaded, a second message to the remote entity, wherein the second message requests that the remote entity execute the second task; and receiving a third message from the remote entity, wherein the third message comprises data associated with the executed second task, wherein the second task is to be combined with the first task.

9. The method of claim 8, further comprising sending wireless transmission parameters for the offloading of the second task to the remote entity.

10. The method of claim 8, further comprising converting the second task into packets to be transmitted over a wireless network.

11. The method of claim 8, further comprising configuring a processor power and wireless transmission parameters at the WTRU based on the reliability requirement.

12. The method of claim 8, wherein the third message is a non-acknowledgement (NACK) message if one or more errors are incurred during the offloading of the second task.

13. The method of claim 12, wherein, upon receipt of the NACK message for the second task, further comprising reconfiguring the service-level requirements for the application.

14. The method of claim 13, further comprising sending the reconfigured service-level requirements to the remote entity.

* * * * *